United States Patent [19]
Rodic

[11] Patent Number: 5,110,024
[45] Date of Patent: May 5, 1992

[54] LOAD CARRIER AND METHOD OF USE

[76] Inventor: Miroslav Rodic, 905 Bayou River Dr., Houston, Tex. 77079

[21] Appl. No.: 554,353

[22] Filed: Jul. 19, 1990

[51] Int. Cl.⁵ .................. B60R 9/00; B60R 7/00
[52] U.S. Cl. ........................ 224/328; 224/309; 224/42.43
[58] Field of Search ............ 296/37.6, 37.7, 37.8, 296/164; 224/328, 42.03 A, 42.43, 310, 42.07, 42.44, 309, 923

[56] References Cited

U.S. PATENT DOCUMENTS 3,260,929 7/1966 Hedgepeth .................. 224/42.07
3,288,519 11/1966 McFarland .................. 296/164
4,406,384 9/1983 Schantz ...................... 224/42.07

FOREIGN PATENT DOCUMENTS 2358753 11/1973 Fed. Rep. of Germany ... 224/42.07

Primary Examiner—Henry J. Recla
Assistant Examiner—David J. Walczak
Attorney, Agent, or Firm—Neal J. Mosely

[57] ABSTRACT

A load carrier device for transportation of a wide variety of items comprises a frame having upper longitudinal skid members connected by spaced upper transverse bracing members and a shelf connected to the upper longitudinal skid members, or the upper transverse bracing members, and lower longitudinal skid members connected by spaced lower transverse bracing members and a shelf connected to the lower longitudinal skid members, or the lower transverse bracing members. The frame, the upper and the lower shelves are supported by a diagonal restraining brace system, and the device enabling placement of the load carrier onto the roof of a vehicle is described. The load carrier device is removably attached to a vehicle with two attachment members fixedly attached to the lower frame portion are extending out and towards receiving device mounted to the frame of a carrier vehicle. An enclosure comprising front wall, the top wall, the two side walls, and the back wall providing an enclosed space is also described as is a method of placing, attaching, and using such a load carrier to enable vehicle operator to carry wide variety of items.

24 Claims, 13 Drawing Sheets

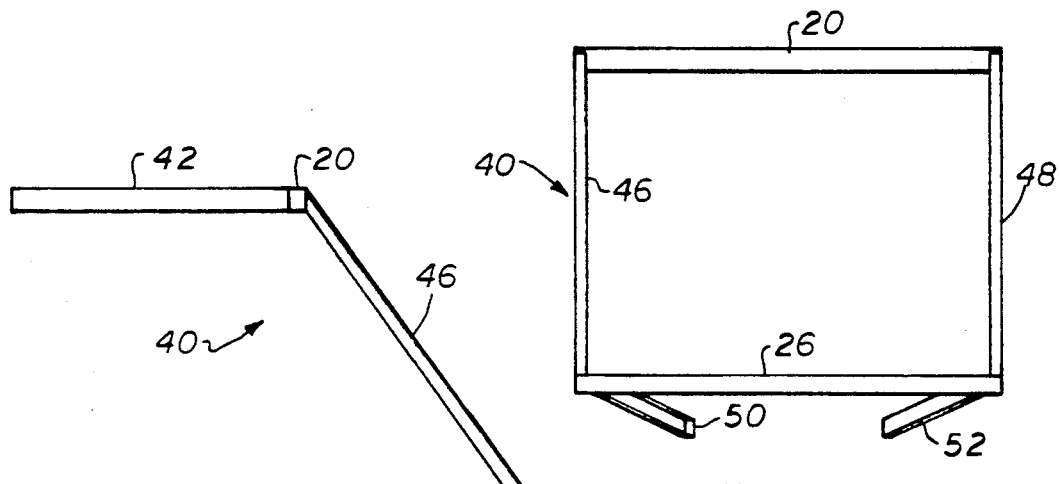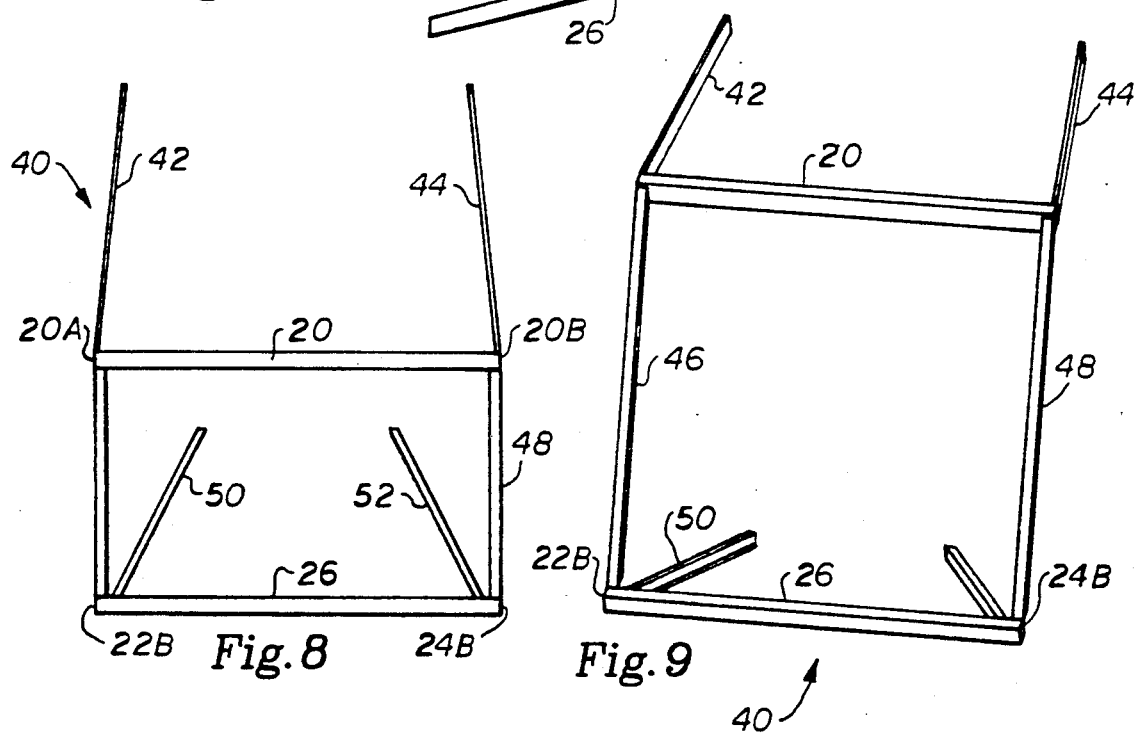

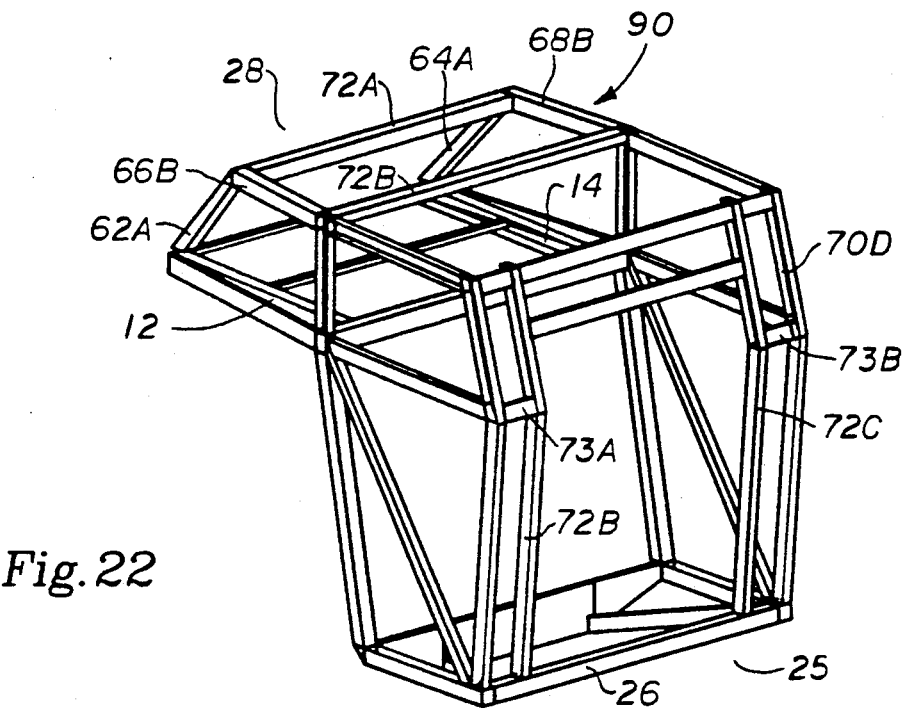
Fig. 22
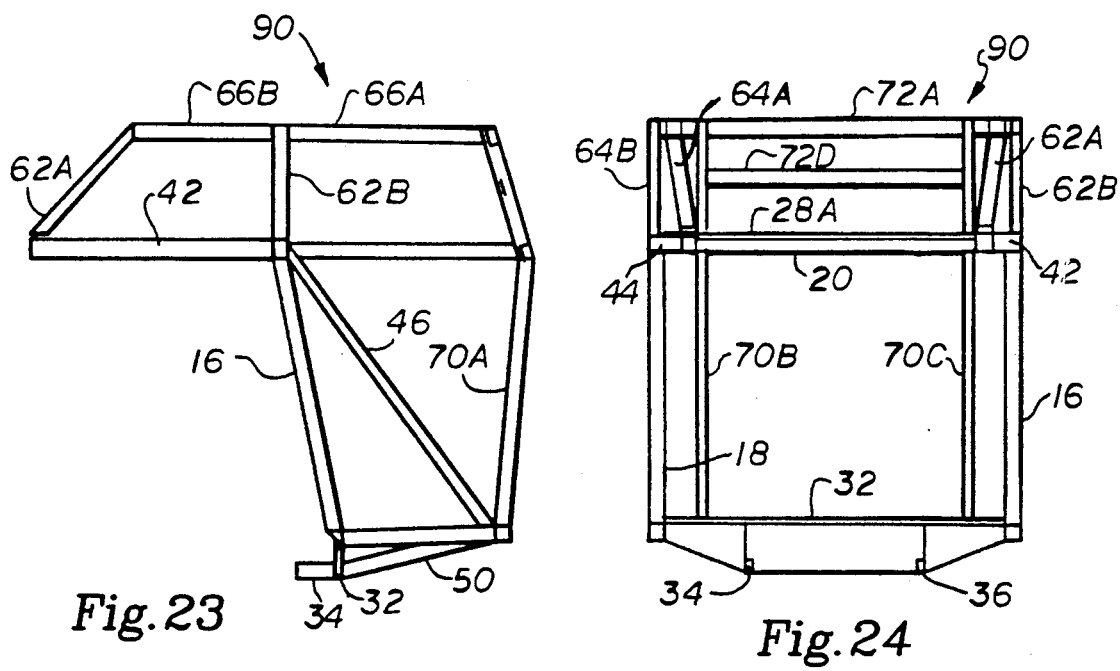
Fig. 23
Fig. 24

LOAD CARRIER AND METHOD OF USE

BACKGROUND OF THE INVENTION

1. Field of the Invention

This invention relates to devices for carrying a load and more particularly, but not by way of limitations, to enclosed self supporting devices for mounting to the rear exterior of a vehicle, and methods of use thereof, for enabling operator of a vehicle to carry a wide variety of items and is adopted to operate without requiring additional mechanical devices such as trailer with axles, springs, and wheels.

2. Description of the Prior Art

At the present time, when available space inside a motor vehicle is inadequate for some intended function required by the operator of a vehicle, any substantially larger additional enclosed space must be obtained either by acquiring separate device such as trailer, or, by physical replacement or removal of some part of an existing vehicle thereby causing permanent change of its original form and intention. Some disadvantages of acquiring and operating separate devices such as trailer may be lack of maneuverability during unfavorable traffic occurrence, pulling of a trailer during travel over the rough surface in an off-road situation, availability of storage space, availability of parking space, additional costs of mechanical upkeep of tires, wheels, and axles, and the cost of registration. Some disadvantages of physical replacement, or removal of a part, or parts, of an existing vehicle may be such as high cost of customizing and replacement system, such as new cargo system replacing original enclosed space, an inadequate gain of additional space resulting from modification to the roof of a vehicle, or the sides of a vehicle Furthermore, such modifications to a vehicle permanently change its original form and intention thus possibly lowering economic value of a vehicle.

Various other types of storage devices and carrier accessories mountable to a top, or a back, of a vehicle have been tried and used. However, these devices have features that limit their use, and are limited in space availability.

One such device is disclosed in Bettenhousen U.S. Pat. No. 4,320,862 comprising an automobile rear baggage container removably mounted to the rear bumper of the automobile and secured to rear wheel wells and to the rear bumper.

Lawrosky U.S. Pat. No. 4,241,858 discloses a carrier accessory for vans utilizing a bracket adaptable to vans which must be used in conjunction with the existing hinge brackets of the vehicle's rear doors having a supplemental support from a frame or bumper.

Chown U.S. Pat. No. 4,593,840 discloses a load carrying unit connected to a vehicle by means of a standard ball-and-socket hitch used in conjunction with a cantilever arm.

Polk U.S. Pat. No. 4,756,457 discloses a cargo and storage apparatus forming a sealed container adapted to be hingedly mounted on the rear exterior of a van-type vehicle.

Disclosures of other types of storage containers are made in U.S. Pat. Nos. 4,671,439; 4,228,011; 4,282,994; 3,999,693; 3,762,758; 3,650,443; 3,228,575; 3,228,576; 3,202,332; 2,746,659; 2,597,656; 2,551,901; and 2,136,157.

To overcome the shortcomings of the existing methods, the present invention was developed to produce an effective gain of additional enclosed space when required by the operator of a vehicle. In contrast to the existing methods, an additional enclosed space is gained by this load carrier device positioned on top, the sides and the back of a carrier vehicle in one unitary structure.

OBJECTS AND SUMMARY OF THE PRESENT INVENTION

When placed onto the vehicle, the present invention as disclosed herein defines generally an enclosed load carrier having a pair of shelves fixedly attached to the frame whereby an upper frame portion, and the shelf thereof, is placed onto the roof of a vehicle over a device enabling the placement. The lower frame portion, and the shelf thereof, having an attachment apparatus, is removably mounted to the frame of a vehicle having a receiving end of the attachment apparatus. When placed on the vehicle, the load carrier's walls define enclosed compartments which may be employed in several capacities for carrying and storing items such as suitcases, bags, tall plants, refrigerator, house appliances, a large variety of tools, or camping equipment. Moreover, if used as a camper, the load carrier provides a room for sleeping, showering, or food preparation. The back portion of the enclosure contains a doors, or a gate, allowing for an unobstructed access to the rear vehicle's entry doors, or a lift-gate, for ease of access to the items stored inside the vehicle's interior.

Thus, it is an important object of the present invention to provide a rearwardly disposed, over-the-roof extending cargo and storage apparatus that is specifically designed for the vehicles with the rear doors or lift gates which can still be ready available for rear access to the interior of the vehicle.

It is still another object of the invention to provide an apparatus that is mounted in such a manner as not to interfere with the rear door or lift gate.

It is a further object of the present invention to provide a wheelless apparatus which may be connected and unconnected quickly and easily without requiring any modification to the body of a vehicle.

It is still another object of the invention that is relatively inexpensive to manufacture, that is easy to operate by an individual, that includes relatively few operating parts, and that is easy to service and maintain.

Other objects of the invention will become apparent from time to time throughout the specification and claims as hereinafter related.

The present invention overcomes the above noted and other shortcomings in the prior art and meets the aforementioned needs by providing a novel and improved load carrier device which enables vehicle operator to carry a wide variety of items with convenience, which is simple of design and manufacture, and which may be conveniently detached from the vehicle and stored when not in use.

The load carrier comprises a frame with plurality of upper spaced longitudinal skid members, a diagonal restraining brace system as a means for connecting the upper spaced longitudinal skid members to a plurality of lower spaced longitudinal skid members variably positioned near the bottom of the back end of the carrier vehicle at some distance below the upper spaced longitudinal skid members. The load carrier frame variously further includes bracing members such as plurality of spaced upper transverse bracing members connecting the plurality of spaced upper longitudinal skid members, and a plurality of spaced lower transverse bracing members connecting the plurality of spaced longitudinal lower skid members.

In various configurations the load carrier furthermore includes a shelf connected to the plurality of spaced upper longitudinal skid members, or the upper transverse bracing members, and a shelf connected to the plurality of spaced lower longitudinal skid members, or the lower transverse bracing members. The load carrier variously further includes a device enabling the placement of the load carrier onto the roof portion location of the carrier vehicle.

A particular embodiment of the present invention further includes enclosure having a front enclosure portion, two sides enclosure portions, top enclosure portion, and the back enclosure portion hereby conveniently referred to as walls of the load carrier for enabling operator of a vehicle to carry a wide variety of items in addition to a load suitable to a vehicle without such additional enclosed space. The present invention also provides a method for placement and attachment of the load carrier to the carrier vehicle. This method comprises placing the load carrier over the roof, the sides, and the back of the carrier vehicle in one continuous forward motion in a general direction of the front of the vehicle. Once the forward motion of the frame and the enclosure has been terminated, the frame and the enclosure is then variously mechanically attached to the carrier vehicle until willfully removed by the operator of the vehicle. The same method of attaching could be obtained by moving the carrier vehicle backwards and towards the stationary load carrier until the vehicle comes to a full stop under the load carrier whereby attachments are made to join the load carrier to the carrier vehicle.

BRIEF DESCRIPTION OF THE DRAWINGS

FIG. 6 is a side view of the diagonal restraining brace system of the load carrier shown in FIG. 1.

FIG. 7 is a rear view of the diagonal restraining brace system of the load carrier.

FIG. 8 is a plan view of the diagonal restraining brace system of the load carrier.

FIG. 9 is a perspective view of the diagonal restraining brace system of the load carrier.

FIG. 22 is a perspective view of the load carrier showing the frame, the enclosure, and the diagonal restraining brace system.

FIG. 23 is a side view of the load carrier depicted in FIG. 22.

FIG. 24 is a front view of the load carrier depicted in FIG. 22.

DETAILED DESCRIPTION OF THE PREFERRED EMBODIMENTS

Figure 1:
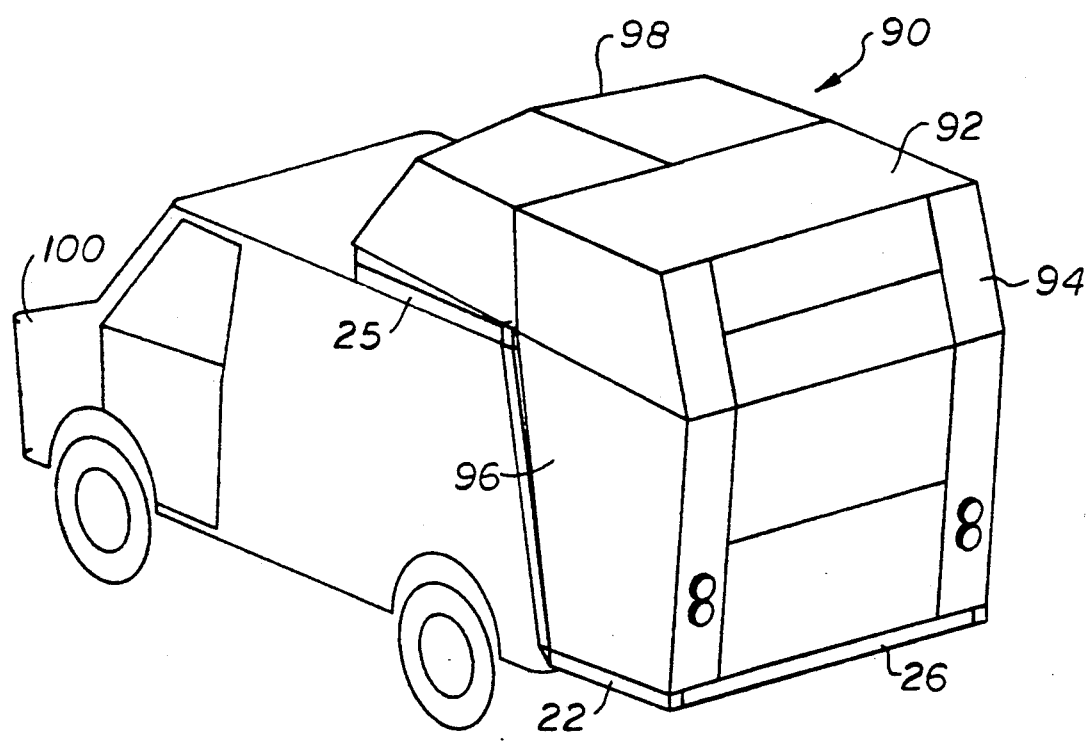
FIG. 1 is a perspective view of a preferred embodiment of the load carrier mounted upon carrier vehicle.
Figure 3:
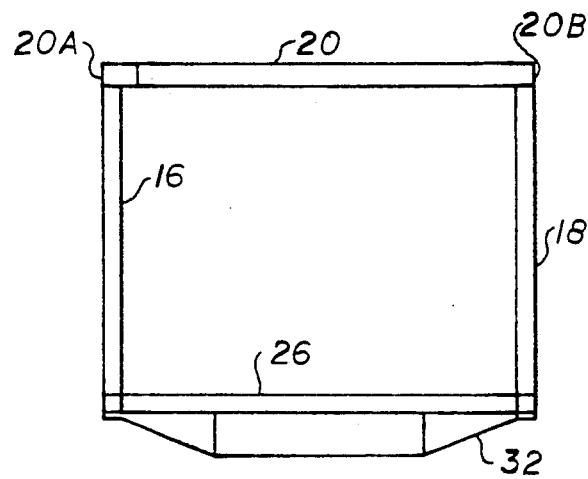
FIG. 3 is a front view of the frame of the load carrier.
Figure 2:
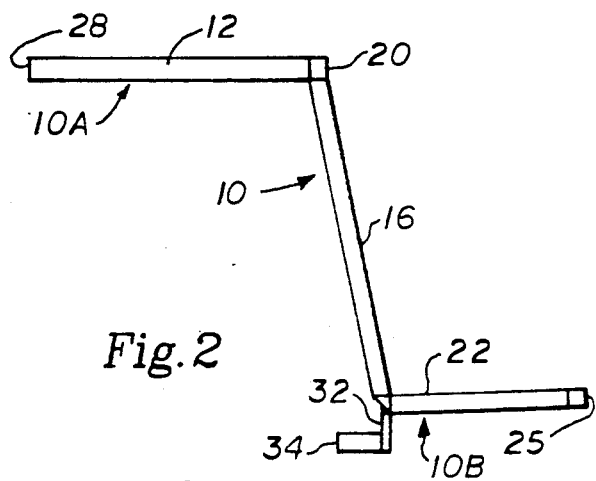
FIG. 2 is a side view of the frame of the load carrier.
Figure 4:
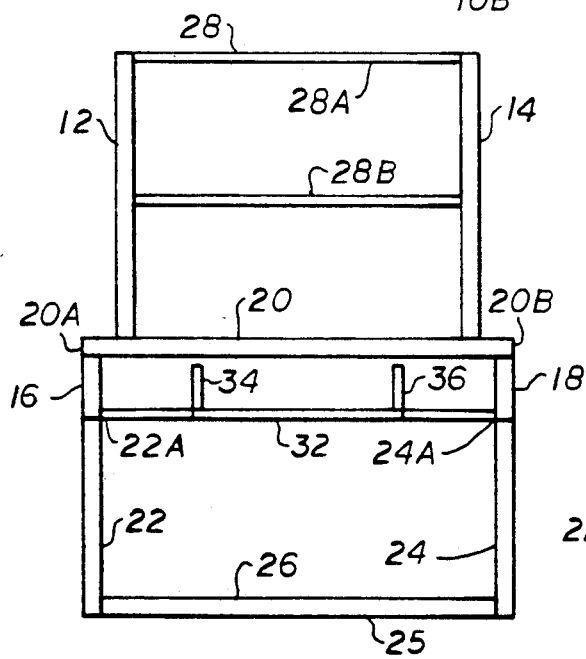
FIG. 4 is a plan view of the frame of the load carrier.
Figure 5:
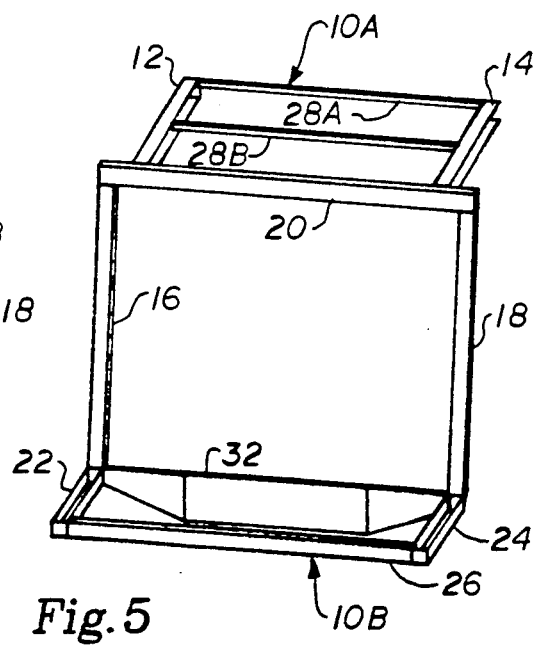
FIG. 5 is a perspective view of the frame of the load carrier shown in FIG. 1.
Figure 10:
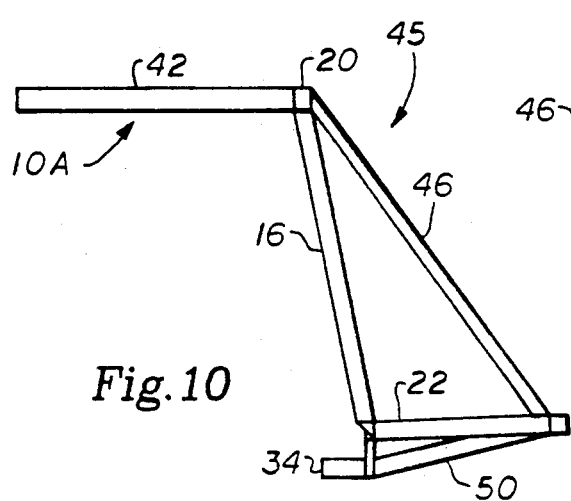
FIG. 10 is a side view of the frame and the diagonal restraining brace system.
Figure 11:
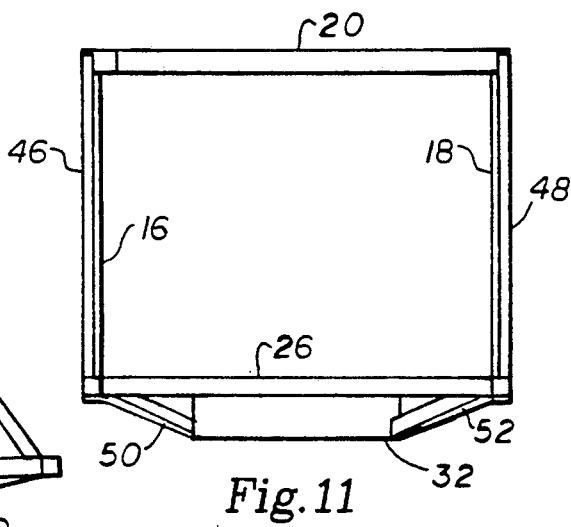
FIG. 11 is a rear view of the frame and the diagonal restraining brace system.
Figure 12:
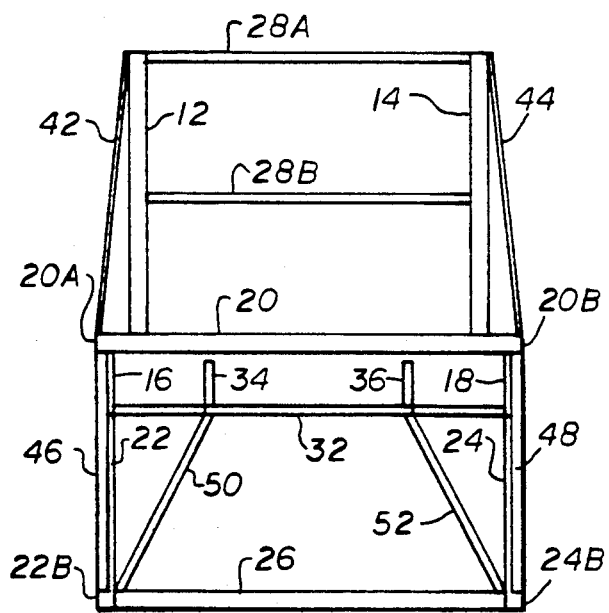
FIG. 12 is a plan view of the frame and the diagonal restraining brace system.
Figure 13:
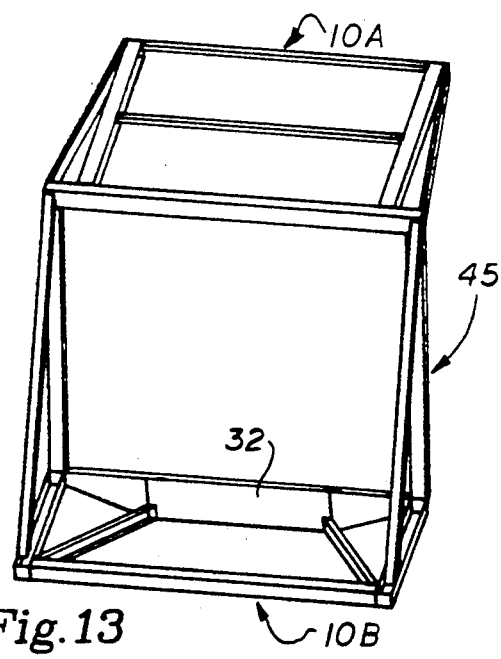
FIG. 13 is a perspective view of the frame and the diagonal restraining brace system.
Figure 13A:
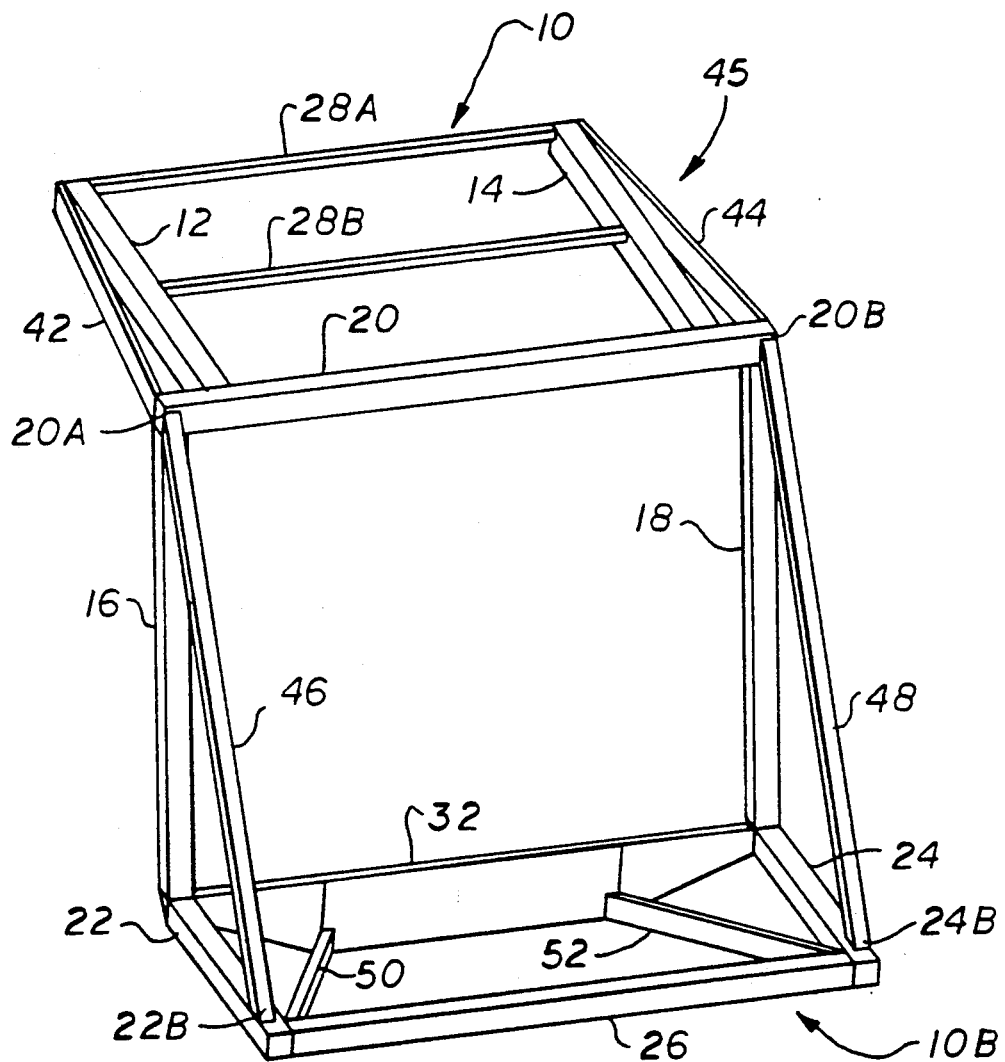
FIG. 13a is an enlarged perspective view of the assembled frame and the diagonal restraining brace system.

Referring now to the drawings, FIG. 1., there is shown a typical van-type vehicle 100 with the load carrier 90 placed upon the roof, the sides, and the back portions of carrier vehicle. In the embodiment of the load carrier shown in FIG. 1, the enclosure consists of the front portion 98 substantially placed perpendicular to the direction of vehicular motion, the side wall 96, the roof portion 92, and the back portion 94.

In FIGS. 2-5, the frame of the present invention is shown and generally designated by the numeral 10. Frame 10 has a front end 28 and a back end 25 and includes the upper portion 10a comprising, but not limited to, two parallel spaced longitudinal skid members 12 and 14, the main upper transverse bracing member 20, and, but not limited to, two parallel spaced transverse bracing members, forward transverse member 28a, middle transverse member 28b, and the lower portion 10b comprising, but not limited to, two parallel spaced longitudinal skid members 22, and 24, two parallel spaced transverse bracing members 26 and 32, of substantially the same length as the main upper transverse bracing member 20, and two spaced parallel attachment bracing members 34 and 36 attached to transverse bracing member 32.

The frame 10 also includes substantially vertically positioned spaced parallel members 16 and 18, respectively, extending from the end portions 20a, and 20b of the main upper transverse bracing member 20 near the edge of the upper portion 10a of the frame 10 downwardly and in a general direction of the first end 22a of the longitudinal member 22, and the first end 24a of the longitudinal member 24 rigidly connecting the upper portion 10a of the frame lo to the lower portion 10b of the frame 10.

All the above members generally comprise rigid, straight tubes, or pipes, or rods, and are connected as described by conventional welding means and methods of attachment; however, other structural materials and connecting means and techniques can be used.

In FIGS. 6-9, a diagonal restraining brace system 40 is shown which further adds to the stability and strength of the frame. The diagonal restraining brace system 40 may be constructed and configured in any number of ways so long as it is sufficiently strong to act to prevent breakage or deformation of the frame that may result under the stress of a heavy load, but in preferred embodiment consists only of a straight tube or pipe.

In the preferred embodiment shown, the diagonal restraining brace system 40 comprises upper diagonal members 42, and 44, attached, as by welding, to the ends of skid members 12 and 14 and transverse member 28a, and to the portions 20a and 20b of the main upper transverse bracing member 20, and members 46 and 48, respectively. Brace members 46 and 48 extend backwardly and downwardly in a general direction of the end of the lower portion 10b of the frame substantially near to the back end 25, and are attached near to the edge 22b of the longitudinal member 22 and the edge 24b of the lower longitudinal member 24, and to members 50, and 52, respectively, extending inward and downward towards the attachment members 34 and 36 in a general direction of the middle of the front end of the lower portion of the frame 10b.

FIGS. 10-13, and FIG. 13A, illustrate the fully connected, as by welding, members of the frame and the members of the diagonal restraining brace system. As depicted in FIGS. 10-13, and FIG. 13A in particular, diagonal restraining brace system members 42 and 44, respectively, are shown attached to the longitudinal skid members 12, and 14, respectively, near the front end 28 of the frame upper portion 10a, and to the end portions 20a and 20b, respectively, of the main upper transverse bracing member 20 near the substantially vertically positioned members 16 and 18. Members 46 and 48, respectively, of the diagonal restraining brace system thereof continue diagonally from the upper main transverse bracing member 20 downwards and backwards towards the rear end 25 of the lower portion of the frame 10b near to the edges 22b and 24b of the lower longitudinal members 22 and 24.

The diagonal spaced parallel members 46 and 48, respectively, are substantially of the same length, so that, in sum, the completed frame, generally designated by the numeral 45 (FIG. 10) consists of the upper portion of the frame 10a and the lower portion of the frame 10b connected to each other by the nearly vertically positioned, parallelly spaced bracing members of substantially the same length, 16 and 18, and by diagonal spaced bracing members 46 and 48, respectively, acting as means for rigidly connecting the upper and the lower portions of the frame.

Members 50 and 52 of the diagonal restraining brace system shown in FIGS. 6-9, on one end attached to the longitudinal members 22 and 24, respectively, as depicted in FIGS. 10-13, and FIG. 13A, near the endpoints 22b and 24b continue inwardly towards the middle of the front end of the lower portion 10b of the frame 10, and downwardly towards the lower edge portion of the transverse bracing member 32 near the attachment members 34 and 36, respectively.

Permanent, or temporary attachment of the load carrier to the carrier vehicle is made in the general area of the lower back portion of the carrier vehicle by the usage of parallel attachment bracing members 34 and 36, equidistantly spaced away from the middle point of the transverse bracing member 32, whereto attached on one end, wherefrom continuing forwardly in a general direction of the receiving end of the receiving apparatus mounted to the frame of the carrier vehicle.

Figure 15:
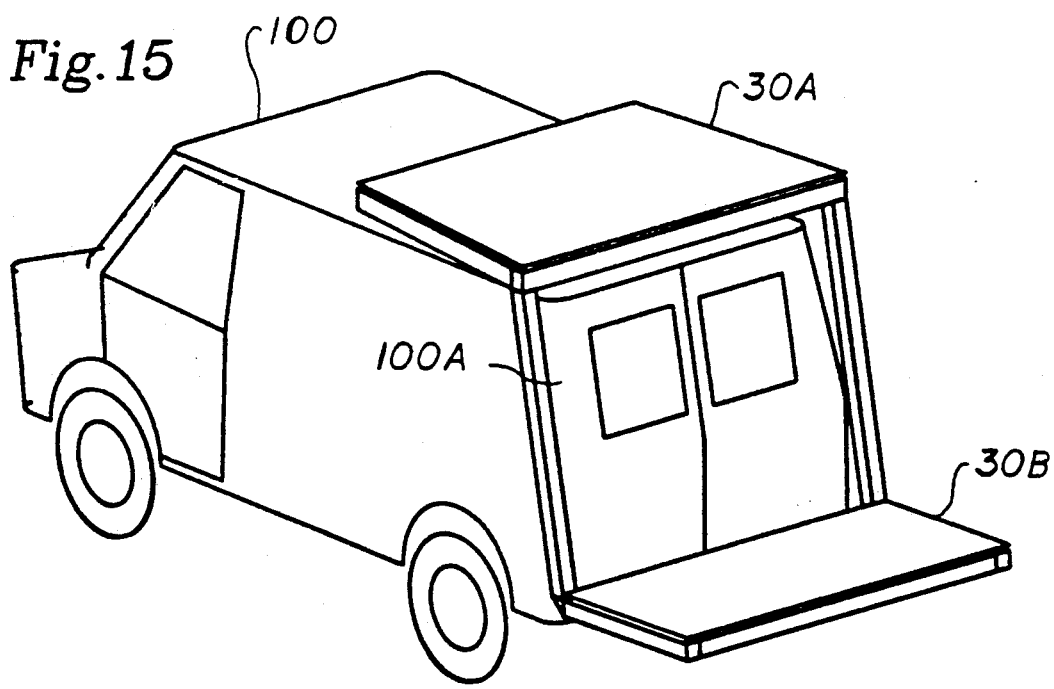
FIG. 15 is a perspective view of the frame and the shelves of the load carrier mounted onto the vehicle.
Figure 15A:
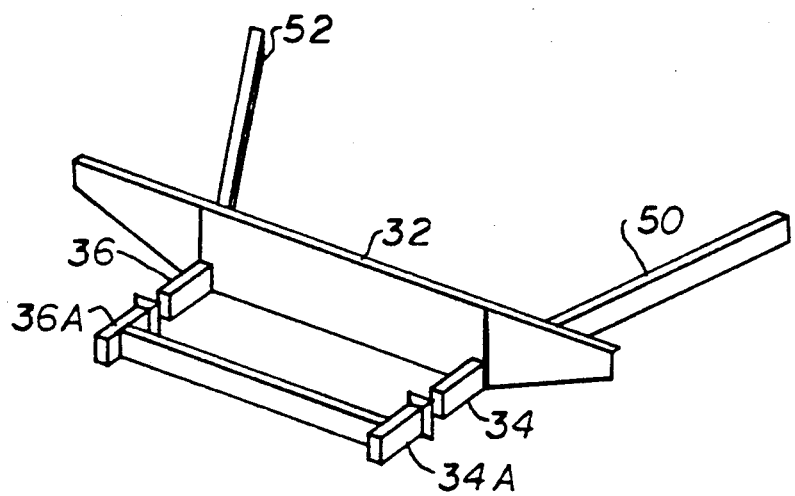
FIG. 15A is a perspective view of the attachment apparatus showing fragmentary lower portion of the frame, the attachment members and the receiving end fixedly attachable to the frame of a vehicle.
Figure 15B:
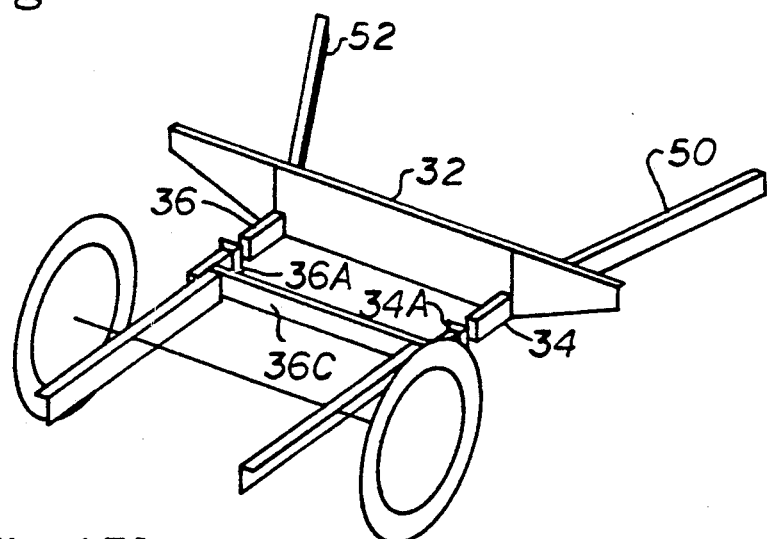
FIG. 15B is a perspective view of the attachment apparatus, showing fragmentary lower portion of the frame, the attachment members, and a partial view of the rear end of the vehicle's frame indicating location of the attachment apparatus.

Referring to the FIG. 15A, and FIG. 15B, the attachment apparatus of the load carrier comprises attachment members 34 and 36, respectively, fixedly attached to the front transverse member 32 of the lower frame portion, and, the receiving square (or rectangular) tubular members 34a and 36a, respectively, fixedly attached near to the back end of the frame of the carrier vehicle. The receiving tubular members 34a, and 36a, of the attachment apparatus, are equidistantly positioned to slidingly receive attachment members 34 and 36, respectively. As shown in FIG. 15B, the receiving tubular members 34a and 36a having been connected by a crossbar 36c are fixedly attached to the frame of a carrier vehicle prior to connecting load carrier. The load carrier is placed in front of receiving tubular members 34a and 36a, respectively, and then slipped into the tubular members with bolts or chains locking the load carrier and the carrier vehicle together.

Figure 16:
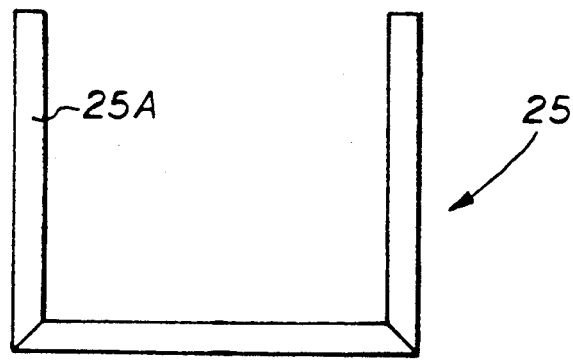
FIG. 16 is a plan view of a device enabling placement of the load carrier onto the roof of the carrier vehicle.
Figure 17:
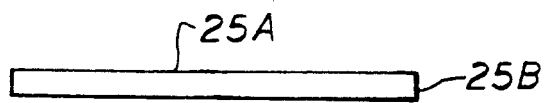
FIG. 17 is a front view of a device enabling placement of the load carrier onto the roof of the carrier vehicle.
Figure 18:
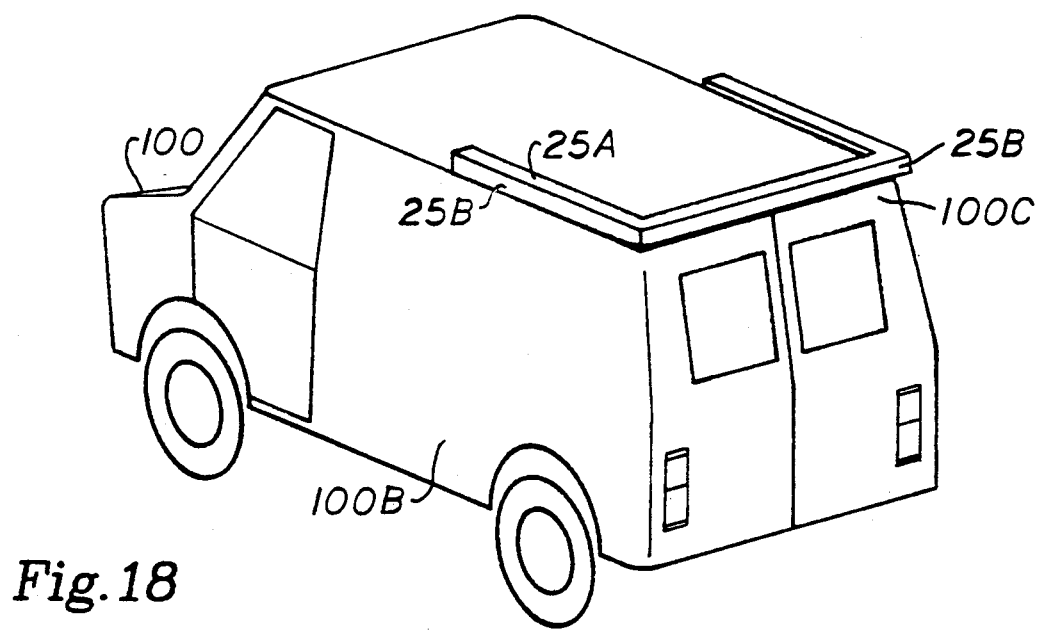
FIG. 18 is a perspective view of a device depicted in FIG. 16 and FIG. 17 when positioned on the carrier vehicle.

A device 25 enabling placement of the load carrier upon the roof of the vehicle carrier is shown in FIGS. 16-18. This device 25 may be constructed of any rigid, or elastic, materials, and configured in any number of ways so long as it is of a sufficient strength as to withstand received weight of a heavy load placed upon the upper portion of the frame and to evenly distribute a pressure of such load onto the edge portions of the roof and the side portions of the carrier vehicle.

In this preferred embodiment, the device 25 enabling the placement of the load carrier comprises an angular guard made of, but not limited to, materials such as rubber, having the general shape of a "U" having an upper surface 25a, an outer surface 25b, a contoured undersurface 25c, and an inner surface 25d. FIG. 18 illustrates the location of the device 25 positioned onto the side edge portions 100a, and the back edge portion 100c of the outside roof surface of the carrier vehicle, beginning at near the center point of the vehicle on one side wherefrom extending towards the back end corner whereof making consecutive angular turns by variably following the surface contours near to the edges of the roof whereof ending at substantially the same distance it begun at the opposite side of the vehicle.

Figure 18A:
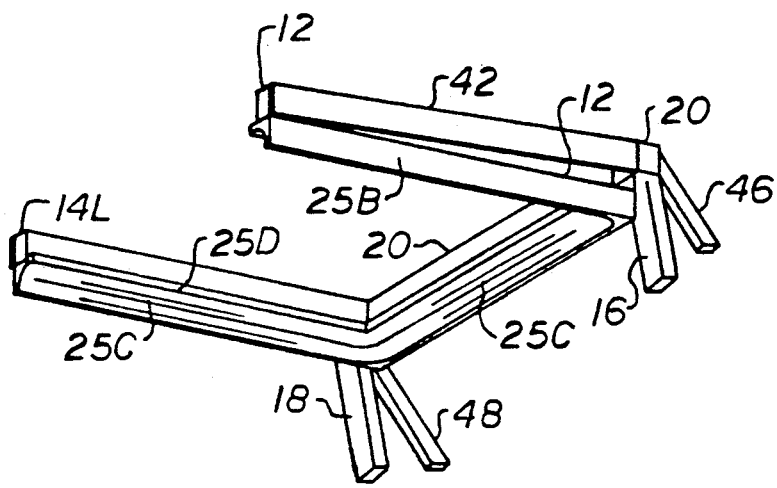
FIG. 18A is a perspective underside view of the device depicted in FIGS. 16, 17, and 18 showing contoured surface portion and fragmentary parts of the upper portion of the frame.
Figure 18B:
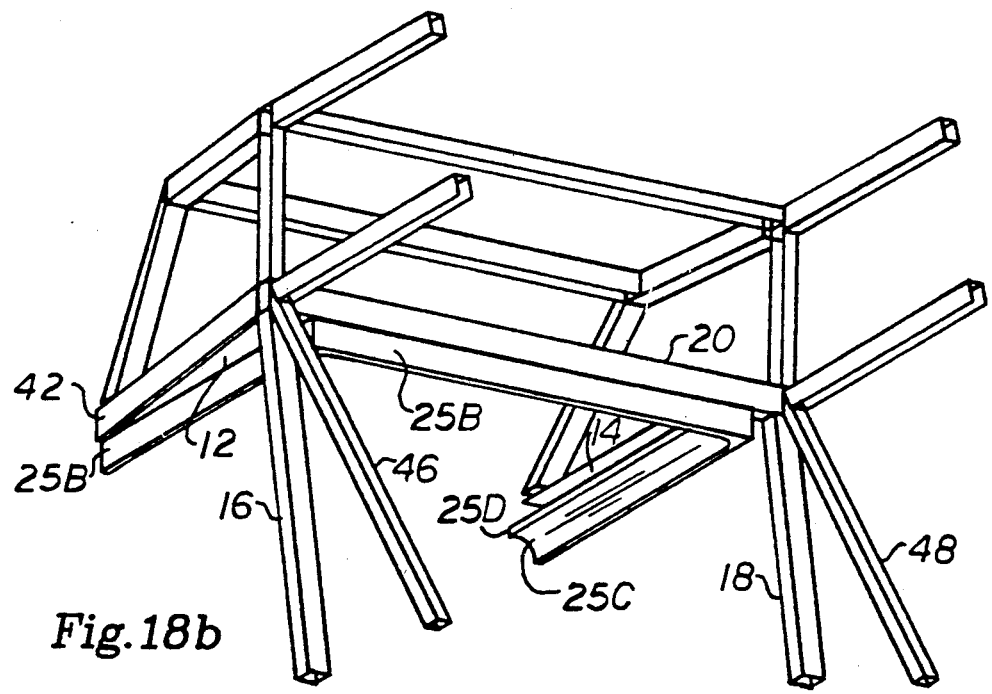
FIG. 18B is a perspective underside view of the device depicted in FIGS. 16, 17, and 18, showing contoured surface portion, upper shelf attached to the upper frame portion, and fragmentary parts of the frame and the enclosure.
Figure 19:
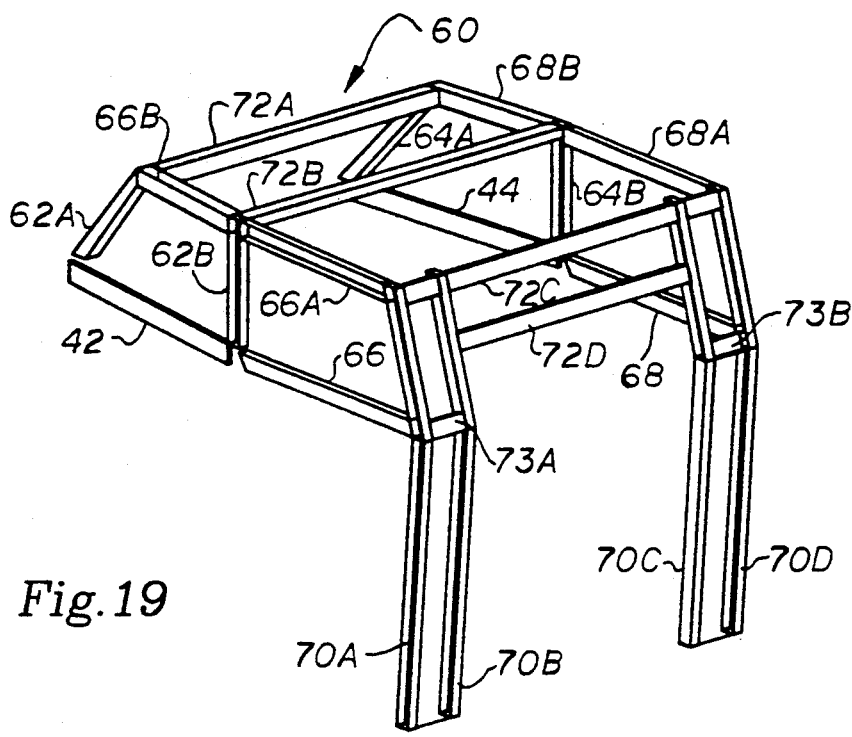
FIG. 19 is a perspective view of the framing for the walls of the enclosure.
Figures 20, 21:
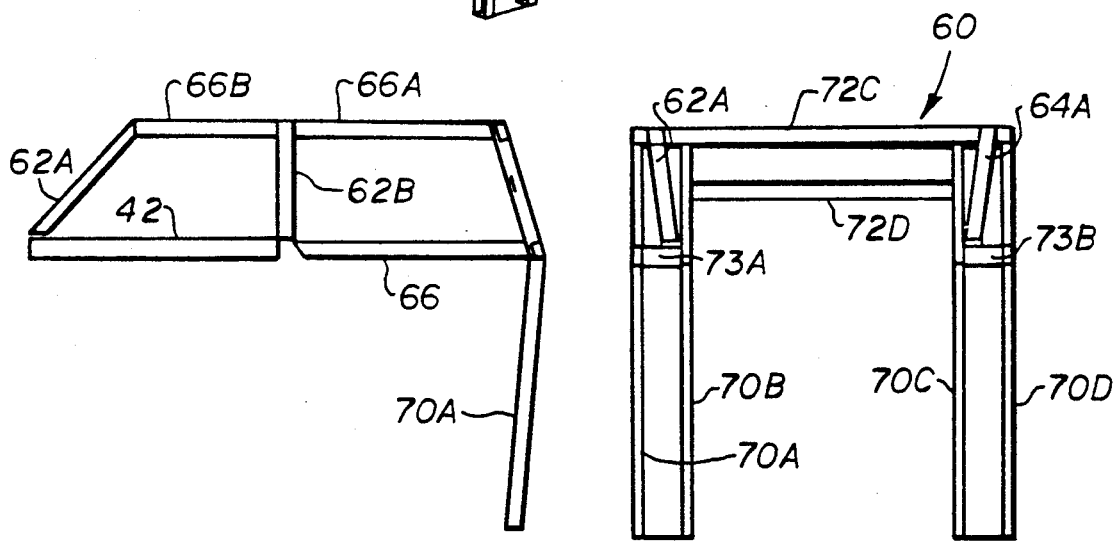
FIG. 20 is a side view of the framing for the walls of the enclosure.
FIG. 21 is a front view of the framing of the walls of the enclosure.

Referring to FIGS. 18a, and 18b, the upper surface 25a of the guard 25 is adapted to accommodate undersurfaces of the upper spaced longitudinal skid members 12 and 14, respectively, and the upper main transverse bracing member 20, whereby receiving the weight placed upon the upper portion of the frame. The undersurface 25c is adapted to accommodate the variably contoured outside surface of the roof of the carrier vehicle whereby distributing received weight placed upon the upper portion of the frame downwards, and sideways, in the general directions towards near the edge portions of the roof, and the side portions of the carrier vehicle.

Figure 14:
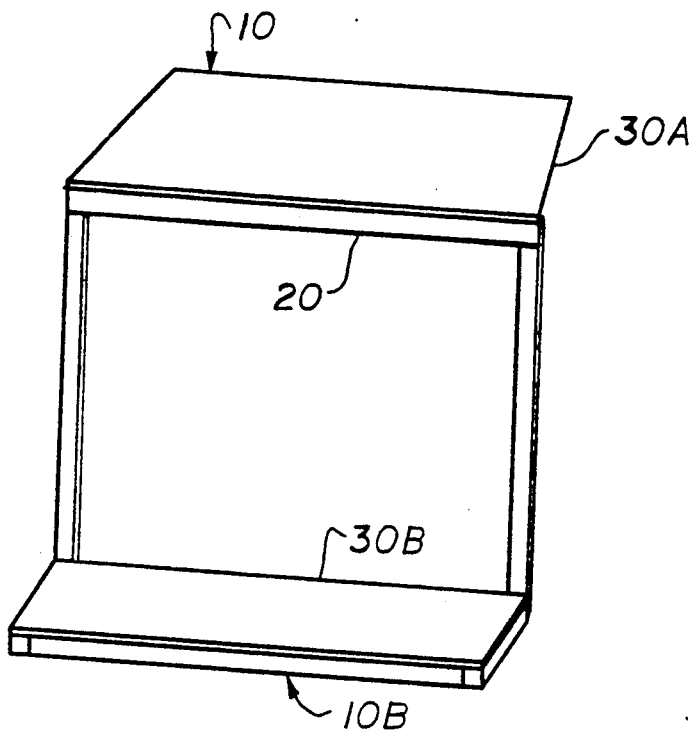
FIG. 14 is a perspective view of the frame with one shelf attached to the upper level portion, and one shelf attached to the lower level portion of the frame of the load carrier.

Referring to FIG. 14, an upper shelf 30a, is fixedly attached to the upper frame portion 10a, and a lower shelf 30b is fixedly attached to the lower frame portion 10b. The method of attachment of the shelves to any of the frame members is not restricted to any specific means for as long as such method maintains, or increases, the strength and structural integrity of the frame. FIG. 15 illustrates the position of the upper shelves 30a attached to the upper portion of the frame, the position of the lower shelves 30b, attached to the lower portion of the frame, and its intended location on the top, and the back of the carrier vehicle 100 with the rear doors or gate 100a of the vehicle exposed for opening without interference by the carrier.

The load carrier 90, as depicted in FIGS. 1-18 is fully capable of performing its intended function of carrying a load placed upon the frame structure, and the system of upper and lower shelves supported by the diagonal restraining brace system without additional framing members. However, the versatility of the present invention is further enhanced by the addition of the enclosure comprising the front, the two sides, the top, and the back portions, as illustrated in FIGS. 19-24.

The enclosure 60 (FIGS. 19, 20, 21) comprises backwardly slanted forward members 62a and 64a, forward longitudinal spaced members 66b and 68b, forward transverse spaced members 72a and 72b, and the substantially vertically positioned members 62b and 64b. The remainder of the enclosure consists of, but is not limited to, longitudinal, substantially parallel spaced members 66, 66a, 68, and 68a, and the back side portion consisting of, but not limited to, two upwardly positioned corner members 70a and 70d, two upwardly positioned inside members 70b and 70c, and the transverse bracing members 72c, 72d, 73a and 73b.

Figure 22A:
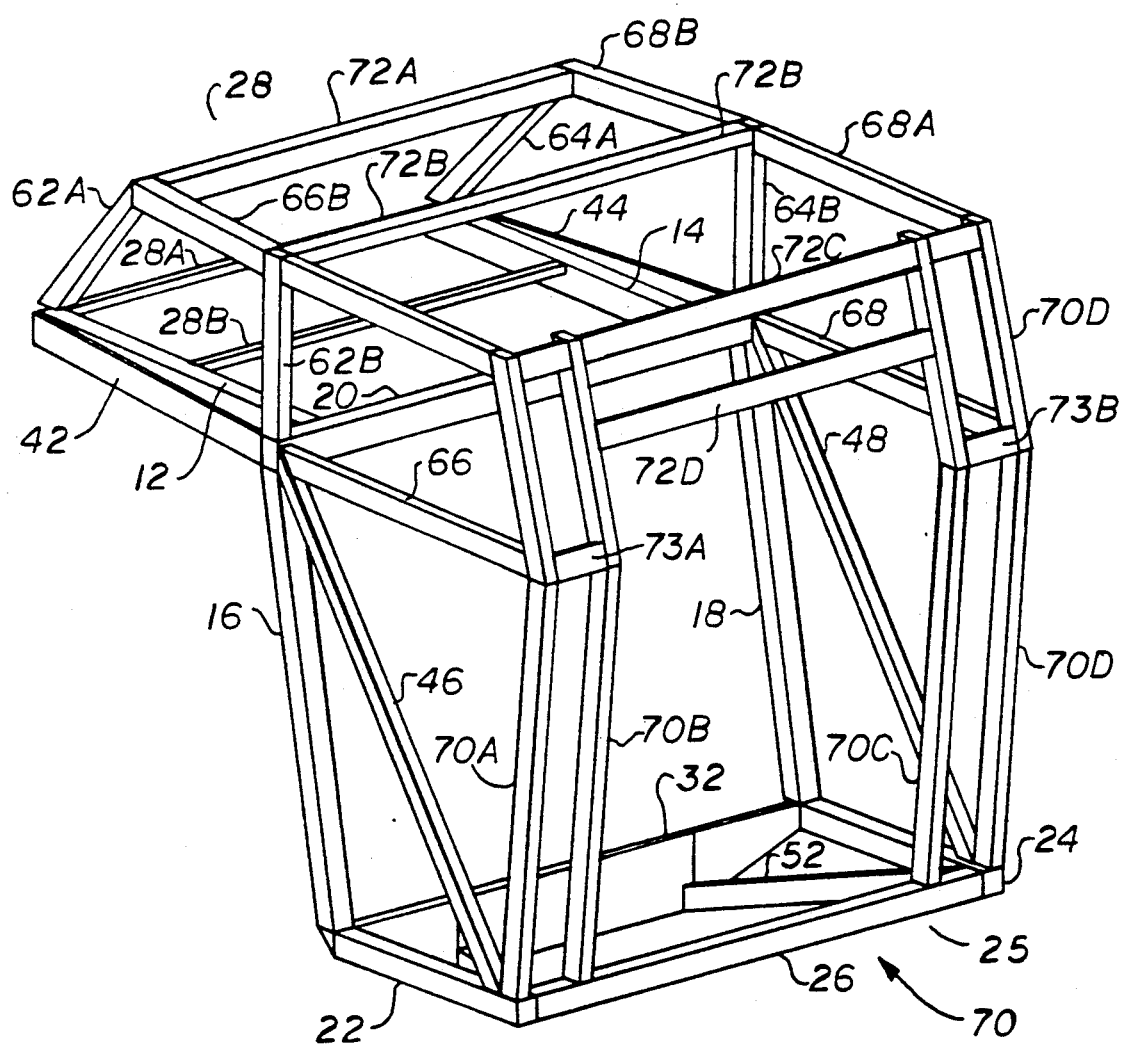
FIG. 22A is an enlarged perspective view of the assembled frame, the diagonal restraining brace system, and the enclosure frame system.

Referring to the FIGS. 22-24, completed framing 70 for the load carrier comprises the frame, the diagonal restraining brace system, and the members of the enclosure. The upper front portion of the enclosure comprises the longitudinal members 66b, 68b, members 42 and 44 of the diagonal restraining brace system, transverse members 72a, supported by the backwardly slanted forward members 62a and 64a, attached, as by welding, near to the front end 28 of the frame, to the upper longitudinal skid members 12 and 14, and the transverse member 72b, supported by the substantially vertical members 62b and 64b, attached, as by welding, to the respective ends of the upper main transverse bracing member 20.

The upwardly positioned corner members 70a and 70d, and the upwardly positioned inside members 70b and 70c, variably spaced along the axis perpendicular to the forward movement of the vehicle, respectively attached at the lower ends, as by welding, to the lower transverse member 26 at the end portion of the frame 25, supported by the variably spaced parallel bracing members of substantially equal length 73a and 73b connecting upwardly positioned corner members 70a and 70d to upwardly positioned inside members 72b, and 72c, respectively comprise the back portion of the enclosure.

To further add to the stability and strength of the back portion of the enclosure, transverse bracing members 72d, and 72c near to the upper end of the back portion of the enclosure, connect, as by welding, the two upwardly positioned inside members 70b and 70c. The area of the back portion of the enclosure defined by upwardly positioned inside members 70b and 70c, and the transverse bracing member 72d provides a support means for enabling access to the rear doors, or a lift gate of the vehicle.

Remaining parallel longitudinal members of the enclosure connect the back end portion of the enclosure to the front end portion of the enclosure. Longitudinal members 66 and 68 respectively, attach, as by welding, the main upper transverse bracing member 20 to the upwardly positioned corner members 70a and 70d respectively, longitudinal members 66a and 68a respectively connect the upwardly positioned corner members 70a and 70d, near to the upper edge of the back end enclosure portion to the upper transverse member 72b and the substantially vertical members 62b and 64b.

In this preferred embodiment, FIG. 22 shows an isometric view of the load carrier 90 completely framed in. The carrier 90 can be used without the framing, as in FIG. 15, or framed in, as in FIG. 22, but is preferably completely enclosed, as in FIGS. 25 and 26.

Figure 25:
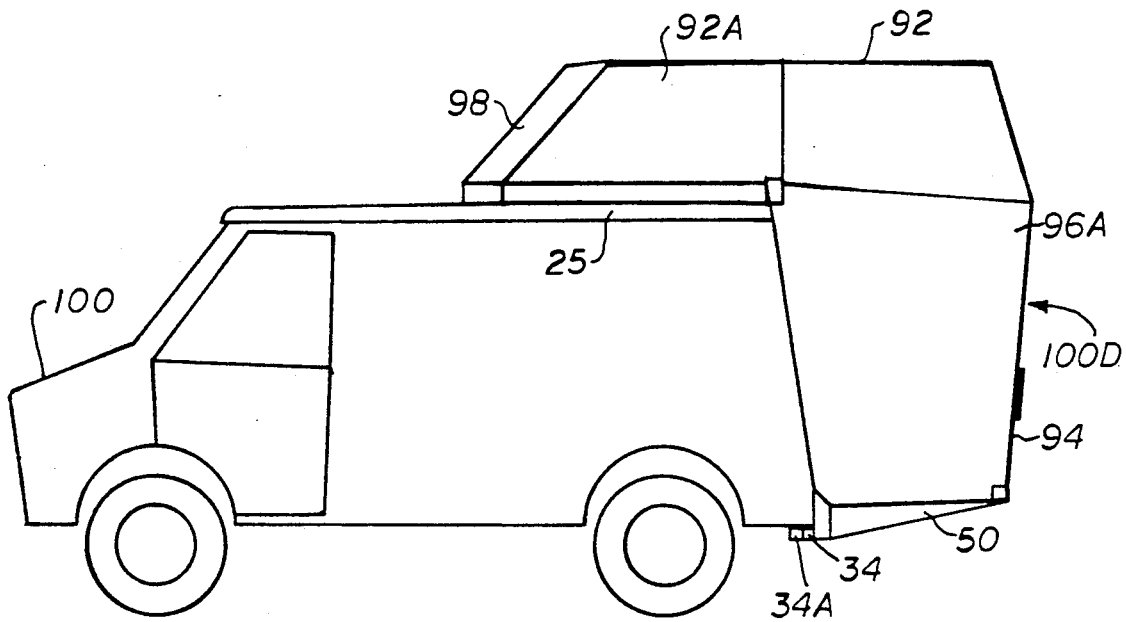
FIG. 25 is a side view of the load carrier positioned on the roof and the back of the carrier vehicle.
Figure 26:
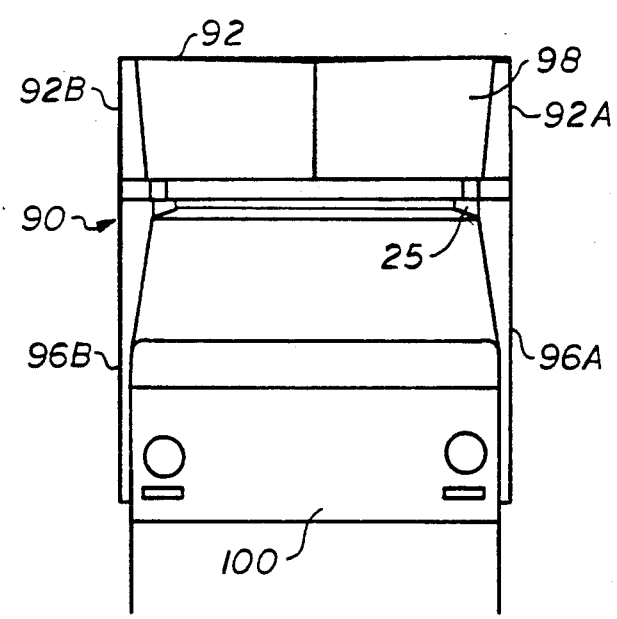
FIG. 26 is a front view of the load carrier positioned on the roof and the sides of the carrier vehicle.

Referring to the FIGS. 25 and 26, the load carrier 90 is completely enclosed by front panel 98, top panel 92, top side panels 92a and 92b, and side panels 96a and 96b. The rear is enclosed by one or more doors 94 of conventional structure permitting access to the carrier. As seen in FIGS. 25 and 26, the load carrier 90 is supported on the top of vehicle 100 on the U-shaped guard 25 and at the rear of the vehicle by bracing members 34 and 36 fitting into tubular supports 34a and 36a. With the load carrier 90 installed as shown, carrier is accessible through rear doors 94 and the vehicle through rear doors or gate 100d which may be left open or removed to make the carrier a permanent extension of the vehicle. The load carrier may be of any suitable size depending on the amount of added load capacity required. If desired, the load carrier can be of a size permitting sleeping accommodations, e.g., a bed, on the upper platform 30a. In such a case, suitable accommodations, e.g., a ladder, would be provided for access to the sleeping area.

While this invention has been described with reference to a preferred embodiment, it should be understood that, within the scope of the appended claims, the invention may be practiced otherwise than as specifically described.

I claim:

1. A load carrier for removable mounting to a vehicle having a frame and a rear door or gate, comprising:
a load-supporting frame comprising an upper horizontal frame portion adapted to be supported on the top of said vehicle;
a lower horizontal frame portion;
vertical means rigidly connecting said upper horizontal frame portion and said lower horizontal frame portion to support said lower horizontal frame portion below said rear door or gate when said upper horizontal frame portion is supported on the top of said vehicle;

a restraining brace system connected to said upper frame portion and said lower frame portion, a shelf secured on said upper frame portion, a shelf secured on said lower frame portion, and an enclosure supported on said upper and lower frame portions open to said rear door or gate when said upper horizontal frame portion is supported on the top of said vehicle, means on said upper horizontal frame portion for securing the same to the top of said vehicle, and means on said lower frame portion operatively engagable with the frame of said vehicle mounting said carrier to said vehicle.

2. A load carrier according to claim 1 in which an enclosure frame supported on said upper and lower frame portions, and panels secured on said enclosure frame defining said enclosure when secured on said vehicle integral therewith and forming a rearward extension thereon.

3. A load carrier according to claim 2 including at least one door closing the rear of said enclosure.

4. A load carrier according to claim 1 including guard means for attachment to the top of said vehicle, said upper frame portion securing means being connectable to said guard means, support means attachable to the frame of said vehicle, and said means on said lower frame portion operatively engagable with the frame of said vehicle being engagable with said support means for mounting said carrier to said vehicle.

5. A load carrier for removable mounting to a vehicle having a frame and a rear door or gate, comprising:

a load-supporting frame comprising an upper horizontal frame portion with a front and portion and a back end portion and a main transverse bracing member and adapted to be supported on the top of said vehicle;

a lower horizontal frame portion comprising a lower horizontal frame portion with a front and portion and a back end portion and a main transverse bracing member;

vertical means rigidly connecting said upper horizontal frame portion and said lower horizontal frame portion to support said lower horizontal frame portion below said rear door or gate when said upper horizontal frame portion is supported on the top of said vehicle;

a restraining brace system connected to said upper frame portion and said lower frame portion, said restraining brace system including:

upper restraining members connecting the front end portion of the frame and the main transverse bracing member of said upper frame portion;

diagonal transverse members extendedly connecting the main transverse bracing member of said upper frame portion and the back end portion of said lower frame portion;

restraining members having top ends fixedly attached to the back end portion of the frame, said members extend from said back end portion of the frame downward and inward to the front transverse bracing member of said lower frame portion;

attachment bracing members fixedly attached to the lower edge of the lower front transverse bracing member of said lower frame portion whereby allowing removable mounting of the load carrier to the carrier vehicle, means on said upper horizontal frame portion for securing said upper horizontal frame portion to the top of said vehicle, and means on said lower frame portion operatively engagable with the frame of said vehicle for mounting said carrier to said vehicle.

6. A load carrier according to claim 5, in which said upper frame portion includes upper longitudinal bracing members, an upper forward transverse bracing member, an upper middle transverse bracing member, and an upper main transverse bracing member interconnecting said longitudinal bracing members;

said lower frame portion includes lower longitudinal bracing members, a lower front transverse bracing member, and a lower back end transverse bracing member interconnecting said lower longitudinal bracing members.

7. A load carrier according to claim 5 including a shelf fixedly attached to said bracing members of said upper frame portion; and a shelf fixedly attached to said bracing members of said lower frame portion.

8. A load carrier according to claim 5 including a shelf fixedly attached to said bracing members of said upper frame portion, a shelf fixedly attached to said bracing members of said lower frame portion, an enclosure means comprising a front enclosure portion fixedly attached to said upper frame portion;

two side enclosure portions fixedly attached to said upper and said lower frame portions and said diagonal transverse bracing members;

a top enclosure portion connecting the front enclosure portion, two side portions and a back enclosure portion; and said back enclosure portion being fixedly attached to the back end of the frame, the top, and the sides portions of the enclosure and having a back side comprising a means for variably mounting a door enabling unobstructed access to the rear door of said vehicle.

9. A load carrier according to claim 5 including a guard having an upper surface contoured to accommodate the undersurface of said upper frame portion; and said guard having an undersurface variably contoured to the outside edges of the outside roof surface near to the sides and the back portion of said vehicle.

10. A load carrier according to claim 5 including a guard having an upper surface contoured to accommodate the undersurface of said upper frame portion;

said guard having an undersurface variably contoured to the outside edges of the outside roof surface near to the sides and the back portion of said vehicle, said upper frame portion includes upper longitudinal brace members, an upper forward transverse bracing member, an upper middle transverse bracing member, and an upper main transverse bracing member interconnecting said longitudinal bracing members;

said lower frame portion includes
lower longitudinal bracing members,
a lower front transverse bracing member, and
a lower back end transverse bracing member interconnecting said lower longitudinal bracing members.

11. A load carrier according to claim 5 including
a guard having an upper surface contoured to accommodate the undersurface of said upper frame portion;
said guard having an undersurface variably contoured to the outside edges of the outside roof surface near to the sides and the back portion of said vehicle,
a shelf fixedly attached to said bracing members of said upper frame portion; and
a shelf fixedly attached to said bracing members of said lower frame portion.

12. A load carrier according to claim 5 including
a guard having an upper surface contoured to accommodate the undersurface of said upper frame portion;
said guard having an undersurface variably contoured to the outside edges of the outside roof surface near to the sides and the back portion of said vehicle,
a shelf fixedly attached to said bracing members of said upper frame portion; and
a shelf fixedly attached to said bracing members of said lower frame portion,
an enclosure means comprising a front enclosure portion fixedly attached to the upper frame portion;
two side enclosure portions fixedly attached to said upper and said lower frame portions and said diagonal transverse bracing members;
a top enclosure portion connecting the front enclosure portion,
two side portions and a back enclosure portion; and
said back enclosure portion being fixedly attached to the back end portion of said load-supporting frame, the top, and the sides portions of the enclosure and having a back side comprising a means for variably mounting a door enabling unobstructed access to the rear door of said vehicle.

13. The combination with a vehicle having a frame and a rear door or gate of a load carrier removably mounted thereon, said carrier comprising:
a load-supporting frame comprising an upper horizontal frame portion supported on the top of said vehicle;
a lower horizontal frame portion;
vertical means rigidly connecting said upper horizontal frame portion and said lower horizontal frame portion to support said lower horizontal frame portion below said rear door or gate when said upper horizontal frame portion is supported on the top of said vehicle;
a restraining brace system connected to said upper frame portion and said lower frame portion,
a shelf secured on said upper frame portion,
a shelf secured on said lower frame portion, and
an enclosure supported on said upper and lower frame portions open to said rear door or gate when said upper horizontal frame portion is supported on the top of said vehicle,
means on said upper horizontal frame portion securing the same to the top of said vehicle, and
means on said lower frame portion operatively engaging the frame of said vehicle mounting said carrier to said vehicle.

14. A combination of a load carrier with a vehicle according to claim 13 in which
an enclosure frame supported on said upper and lower frame portions, and
panels secured on said enclosure frame define said enclosure secured on said vehicle integral therewith and forming a rearward extension thereon.

15. A combination of a load carrier with a vehicle according to claim 14 including
at least one door closing the rear of said enclosure.

16. A combination of a load carrier with a vehicle according to claim 13 including
guard means for attachment to the top of said vehicle,
said upper frame portion securing means being connectable to said guard means,
support means attachable to the frame of said vehicle, and
said means on said lower frame portion operatively engagable with the frame of said vehicle being engagable by said support means mounting said carrier to said vehicle.

17. The combination with a vehicle having a frame and a rear door or gate of a load carrier removably mounted thereon, said carrier comprising:
a load-supporting frame comprising an upper horizontal frame portion with a front and portion and a back end portion and a main transverse bracing member and supported on the top of said vehicle;
a lower horizontal frame portion comprising a lower horizontal frame portion with a front and portion and a back end portion and a main transverse bracing member;
vertical means rigidly connecting said upper horizontal frame portion and said lower horizontal frame portion to support said lower horizontal frame portion below said rear door or gate when said upper horizontal frame portion is supported on the top of said vehicle;
a restraining brace system connected to said upper frame portion and said lower frame portion,
said restraining brace system connected to said upper frame portion and said lower frame portion,
said restraining brace system including:
upper restraining members connecting the front end portion of the frame and the main transverse bracing member of said upper frame portion;
diagonal transverse members extendedly connecting the main transverse bracing member of said upper frame portion and the back end portion of said lower frame portion;
restraining members having top ends fixedly attached to the back end portion of the frame, said members extend from said back end portion of the frame downward and inward to the front transverse bracing member of said lower frame portion;
attachment bracing members fixedly attached to the lower edge of the lower front transverse bracing member of said lower frame portion removably mounting the load carrier to the carrier vehicle,
means on said upper horizontal frame portion for securing said upper horizontal frame portion to the top of said vehicle, and
means on said lower frame portion operatively engagable with the frame of said vehicle for mounting said carrier to said vehicle.

18. A combination of a load carrier with a vehicle according to claim 17, in which
said upper frame portion includes
upper longitudinal bracing members,
an upper forward transverse bracing member,
an upper middle transverse bracing member, and
an upper main transverse bracing member interconnecting said longitudinal bracing members;
said lower frame portion includes
lower longitudinal bracing members,
a lower front transverse bracing member, and
a lower back end transverse bracing member interconnecting said lower longitudinal bracing members.

19. A combination of a load carrier with a vehicle according to claim 17 including
a shelf fixedly attached to said brace members of said upper frame portion; and
a shelf fixedly attached to said brace members of said lower frame portion.

20. A combination of a load carrier with a vehicle according to claim 17 including
a shelf fixedly attached to said brace members of said upper frame portion,
a shelf fixedly attached to said brace members of said lower frame portion,
an enclosure means comprising a front enclosure portion fixedly attached to said upper frame portion;
two side enclosure portions fixedly attached to said upper and said lower frame portions and said diagonal transverse bracing members;
a top enclosure portion connecting the front enclosure portion,
two side portions and a back enclosure portion; and
said back enclosure portion being fixedly attached to the back end of the frame, the top, and the sides portions of the enclosure and having a back side comprising a means for variably mounting a door enabling unobstructed access to the rear door of said vehicle.

21. A combination of a load carrier with a vehicle according to claim 17 including
a guard having an upper surface contoured to accommodate the undersurface of said upper frame portion; and
said guard having an undersurface variably contoured to the outside edges of the outside roof surface near to the sides and the back portion of said vehicle.

22. A combination of a load carrier with a vehicle according to claim 17 including
a guard having an upper surface contoured to accommodate the undersurface of said upper frame portion;
said guard having an undersurface variably contoured to the outside edges of the outside roof surface near to the sides and the back portion of said vehicle,
said upper frame portion includes
upper longitudinal bracing members,
an upper forward transverse bracing member,
an upper middle transverse bracing member, and
an upper main transverse bracing member interconnecting said longitudinal bracing members;
said lower frame portion includes
lower longitudinal bracing members,
a lower front transverse bracing member, and
a lower back end transverse bracing member interconnecting said lower longitudinal bracing members.

23. A combination of a load carrier with a vehicle according to claim 17 including
a guard having an upper surface contoured to accommodate the undersurface of said upper frame portion;
said guard having an undersurface variably contoured to the outside edges of the outside roof surface near to the sides and the back portion of said vehicle,
a shelf fixedly attached to said bracing members of said upper frame portion; and
a shelf fixedly attached to said bracing members of said lower frame portion.

24. A combination of a load carrier with a vehicle according to claim 17 including
a guard having an upper surface contoured to accommodate the undersurface of said upper frame portion;
said guard having an undersurface variably contoured to the outside edges of the outside roof surface near to the sides and the back portion of said vehicle,
a shelf fixedly attached to said bracing members of said upper frame portion,
a shelf fixedly attached to said bracing members of said lower frame portion,
an enclosure means comprising a front enclosure portion fixedly attached to said upper frame portion;
two side enclosure portions fixedly attached to said upper and said lower frame portions and said diagonal transverse bracing members;
a top enclosure portion connecting the front enclosure portion,
two side portions and a back enclosure portion; and
said back enclosure portion being fixedly attached to the back end portion of said load-supporting frame, the top, and the sides portions of the enclosure and having a back side comprising a means for variably mounting a door enabling unobstructed access to the rear door of said vehicle.

* * * * *